US009398473B2

(12) United States Patent
Goerke et al.

(10) Patent No.: US 9,398,473 B2
(45) Date of Patent: Jul. 19, 2016

(54) SYSTEM AND METHOD FOR LOAD BASED OPTIMIZATION IN COMMUNICATION NETWORKS

(75) Inventors: Thomas Goerke, Attadale (AU); Mark Grayson, Maidenhead (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 13/332,804

(22) Filed: Dec. 21, 2011

(65) Prior Publication Data

US 2013/0163424 A1    Jun. 27, 2013

(51) Int. Cl.
*H04L 12/26*    (2006.01)
*H04W 24/02*    (2009.01)
*H04W 8/02*    (2009.01)
*H04W 88/16*    (2009.01)

(52) U.S. Cl.
CPC .............. *H04W 24/02* (2013.01); *H04L 12/26* (2013.01); *H04W 8/02* (2013.01); *H04W 88/16* (2013.01)

(58) Field of Classification Search
CPC . H04W 28/0247; H04W 24/02; H04W 88/16; H04W 8/02; H04L 12/26
See application file for complete search history.

(56) References Cited

U.S. PATENT DOCUMENTS

| | | | |
|---|---|---|---|
| 6,917,592 B1 | 7/2005 | Ramankutty et al. | |
| 7,340,744 B2 | 3/2008 | Chandwadkar et al. | |
| 7,362,776 B2 | 4/2008 | Meier et al. | |
| 7,415,523 B2 | 8/2008 | O'Rourke et al. | |
| 7,929,973 B2 | 4/2011 | Zavalkovsky et al. | |
| 8,064,948 B2 | 11/2011 | Meier et al. | |
| 2005/0239473 A1 | 10/2005 | Pan et al. | |
| 2006/0018787 A1 | 1/2006 | Guo | |
| 2006/0022770 A1 | 2/2006 | Asakawa | |
| 2007/0025332 A1 | 2/2007 | Adolfsson | |
| 2007/0116019 A1 | 5/2007 | Cheever et al. | |
| 2007/0116020 A1 | 5/2007 | Cheever et al. | |
| 2008/0013754 A1 | 1/2008 | Chuo et al. | |
| 2008/0031705 A1 | 2/2008 | Severns | |
| 2008/0316980 A1 | 12/2008 | Ahlen et al. | |
| 2009/0163223 A1* | 6/2009 | Casey | 455/453 |
| 2010/0124933 A1* | 5/2010 | Chowdhury et al. | 455/453 |

(Continued)

OTHER PUBLICATIONS

3GPP TS 23.271 v10.2.0 (Mar. 2003), "3rd Generation Partnership Project; Technical Specification Group Services and Systems Aspects; Functional Stage 2 Description of Location Services (LCS) (Release 10)", 169 pages.

(Continued)

*Primary Examiner* — Alpus H Hsu
*Assistant Examiner* — Walter Divito
(74) *Attorney, Agent, or Firm* — Patent Capital Group

(57) ABSTRACT

Systems and methods for providing load based optimizations in communication networks are provided. A network device that provides network management and exchanges control messages with other network devices in the communication network can be modified to masquerade as a radio access transceiver to obtain radio access transceiver load information. The network device can be modified to include a radio-related interface and can communicate messages with the radio access transceivers to setup a radio access transceiver connection for exchange of load information. The radio access transceiver load information can then be used in the core network to provide optimizations for the loaded radio access transceivers. The optimizations can include modifying packet flows to decrease the bandwidth needed and switching one or more packet flows to another radio access transceiver.

21 Claims, 10 Drawing Sheets

(56) References Cited

U.S. PATENT DOCUMENTS

| | | | |
|---|---|---|---|
| 2010/0296499 A1* | 11/2010 | Karaoguz et al. | 370/338 |
| 2011/0038431 A1* | 2/2011 | Frederiksen et al. | 375/259 |
| 2011/0058479 A1 | 3/2011 | Chowdhury | |
| 2011/0075557 A1 | 3/2011 | Chowdhury et al. | |
| 2011/0075675 A1 | 3/2011 | Koodli et al. | |
| 2011/0090839 A1* | 4/2011 | Hamalainen et al. | 370/315 |
| 2011/0268007 A1* | 11/2011 | Barany et al. | 370/312 |
| 2012/0016661 A1 | 1/2012 | Pinkas | |
| 2012/0017054 A1 | 1/2012 | Arai et al. | |
| 2012/0087298 A1* | 4/2012 | Garavaglia et al. | 370/315 |
| 2012/0163179 A1* | 6/2012 | Jo et al. | 370/237 |
| 2012/0188949 A1* | 7/2012 | Salkintzis et al. | 370/329 |
| 2012/0230191 A1* | 9/2012 | Fang | 370/235 |
| 2013/0065562 A1* | 3/2013 | Singh | 455/414.1 |
| 2013/0100821 A1* | 4/2013 | Joshi | 370/241 |
| 2013/0122911 A1* | 5/2013 | Zdarsky et al. | 455/438 |
| 2013/0163424 A1 | 6/2013 | Goerke et al. | |
| 2013/0163434 A1 | 6/2013 | Hamel et al. | |
| 2013/0163463 A1 | 6/2013 | Grayson et al. | |

OTHER PUBLICATIONS

3GPP TS 23.402 v11.0.0 (Sep. 2011), "3rd Generation Partnership Project; Technical Specification Group Services and System Aspects; Architecture Enhancements for Non-3GPP Accesses (Release 11)", 232 pages.

3GPP TS 24.302 v11.0.0 (Sep. 2011), "3rd Generation Partnership Project; Technical Specification Group Core Network and Terminals; Access to the 3GPP Evolved Packet Core (EPC) via Non-3GPP Access Networks; Stage 3 (Release 11)", 58 pages.

3GPP TS 24.312 v11.0.0 (Sep. 2011), "3rd Generation Partnership Project; Technical Specification Group Core Network and Terminals; Access Network Discovery and Selection Function (ANDSF) Management Object (MO) (Release 11)", 157 pages.

3GPP TS 36.305 v10.3.0 (Sep. 2011), "3rd Generation Partnership Project; Technical Specification Group Radio Access Network; Evolved Universal Terrestrial Radio Access Network (E-UTRAN); Stage 2 Functional Specification of User Equipment (Ue) Positioning in E-Utran (Release 10)", 51 pages.

3GPP TS 36.413 v10.3.0 (Sep. 2011), "3rd Generation Partnership Project; Technical Specification Group Radio Access Network; Evolved Universal Terrestrial Radio Access Network (E-UTRAN); S1 Application Protocol (S1AP) (Release 10)", 255 pages.

3GPP Ts 36.423 v10.3.0 (Sep. 2011), "3rd Generation Partnership Project; Technical Specification Group Radio Access Network; Evolved Universal Terrestrial Radio Access Network (E-UTRAN); X2 Application Protocol (X2AP) (Release 10)", 132 pages.

Calhoun, et al., "CAPWAP Protocol Specification: draft-ietf-capwap-protocol-specification-15", Network Working Group, Internet-Draft, Oct. 31, 2008, 165 pages.

Cisco, "Cisco Location Service Solution: Enabling Mobility in Wired and Wireless Networks with Modular Cisco Catalyst Platforms", Jul. 2011, 5 pages.

Cisco, "Lightweight AP (LAP) Registration to a Wireless LAN Controller (WLC)", Document ID: 70333, Updated Sep. 12, 2008, 13 pages.

Simsek, et al., "Analysis of the QBSS Load Element Parameters of 802.1 1e for a Priori Estimation of Service Quality", 21st UK Performance Engineering Workshop (UKPEW05), Jul. 2005, 16 pages.

* cited by examiner

SYSTEM AND METHOD FOR LOAD BASED OPTIMIZATION IN COMMUNICATION NETWORKS

RELATED APPLICATIONS

The present application is related to U.S. patent application Ser. No. 13/333,381 filed Dec. 21, 2011, by Grayson, entitled "Systems and Methods for Load Balancing in Cellular Networks and Wireless Local Area Networks", which is hereby incorporated by reference herein in its entirety.

FIELD OF THE DISCLOSURE

This disclosure relates generally to systems and methods for providing load information from radio access transceivers to the core network and using the load information to make decisions in the core network.

BACKGROUND

Wireless networks are telecommunication networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points. Wireless communication technologies are used in connection with many user equipment, including, for example, satellite communications systems, portable digital assistants (PDAs), laptop computers, and mobile devices (e.g., cellular telephones). Such devices can connect to a network (e.g., the Internet) as long as the user is within range of such a wireless communication technology.

The increase in data traffic is straining wireless network operators' existing networks. The increase in data traffic can overload network devices in wireless networks, and it may even cause wireless network service disruptions. The demand for data over wireless networks is not expected to slow, especially as mobile devices become more sophisticated and as users become more dependent on mobile devices.

DESCRIPTION OF EXAMPLE EMBODIMENTS

Overview

In some embodiments, a method is disclosed that includes communicating control plane messages at a mobility management device, communicating with radio access transceivers over a radio-related interface from the mobility management device, receiving radio access transceiver load information over the radio-related interface from the radio access transceivers, and sending the radio access transceiver load information to a gateway.

Example Embodiments

The increase in data traffic is straining wireless network operators' existing networks. This trend is likely to continue as the computing power of mobile devices increases and more users switch to data intensive tasks over wireless networks. Users with smart phones and wireless enabled computers use applications that frequently request data and consume bandwidth. However, the load in some communication networks can be non-uniform. By some accounts, typically less than five percent of a network's radio access transceiver sites are being utilized over fifty percent, where radio access transceivers provide wireless communication capabilities with wireless devices. Load information from the radio access transceivers can be used by network devices to make decisions that allow the network to operate more efficiently. Network devices at the core of the network do not receive load information from the radio access transceivers and are therefore unable to alter network behavior in the core network to increase network efficiency.

Once network devices are able to access load information, this load information can be used to initiate a range of optimizations at the network devices to manage the load on the network. For example, mobile devices could be directed to a radio access transceiver that is less loaded and can provide a better experience. Mobile devices may even be directed to parallel communication networks such as femto networks or wireless local area networks. The mobile devices can be provided the loading information of the network in order to make a determination as to which network to attach. This can be useful for mobile devices that may not be able to determine network loading conditions without attaching to each of the various networks first. In addition, other operations on the network device can be provided in order to make communications with those radio access transceivers more efficient. This can include a network device processing incoming packet data that is destined to a loaded radio access transceiver. The processing can include compressing aspects of the packet flow or using more efficient transmission protocols. Other load based changes can be made as well, such as offloading more traffic from the network device to the internet to avoid overloading the backhaul link.

Figure 1:
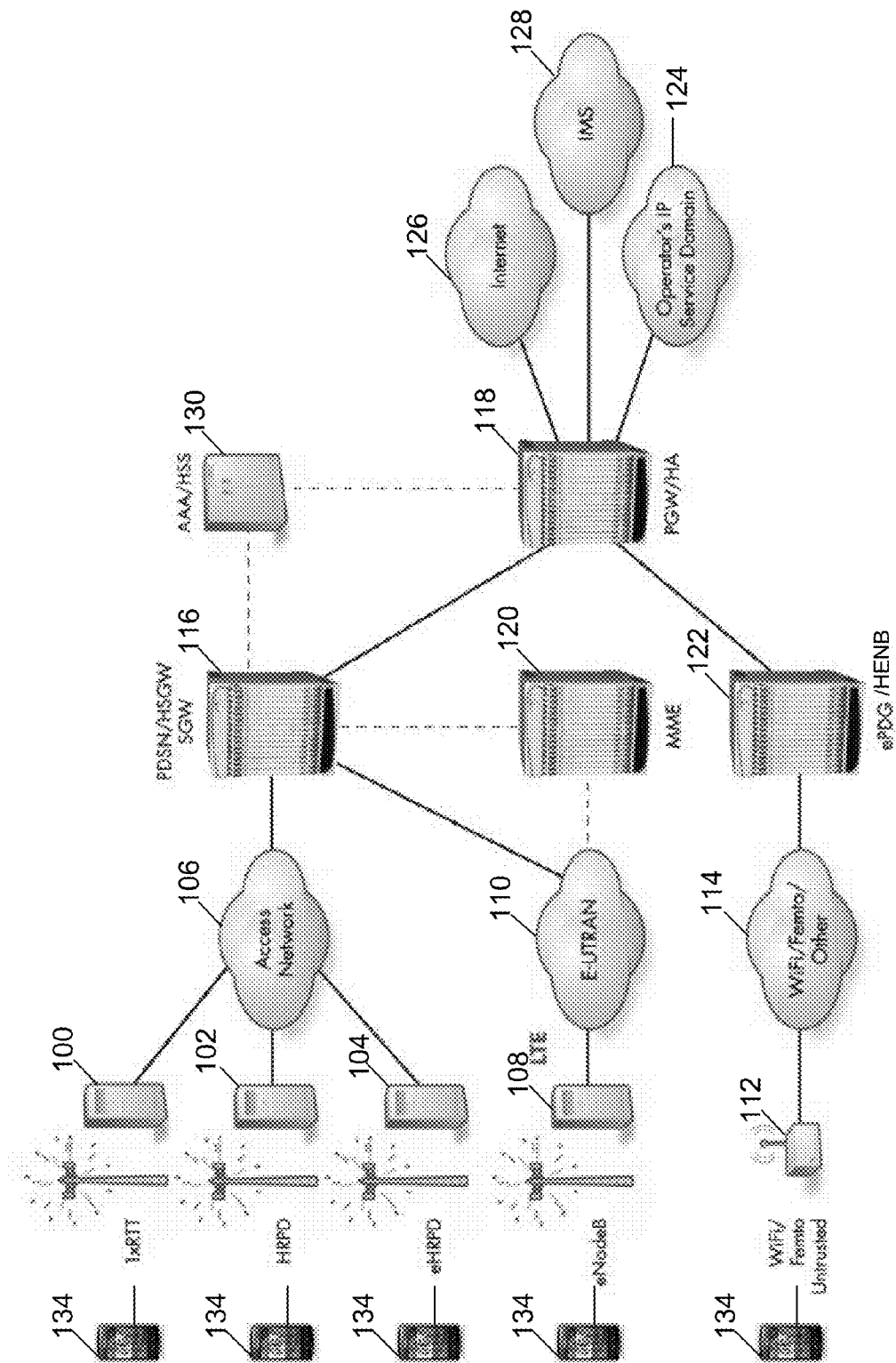
FIGS. 1-2 illustrate a communication network including a long term evolution (LTE) topology in accordance with certain embodiments.

FIG. 1 illustrates a communication system that supports load balancing in accordance with certain embodiments. FIG. 1 includes a number of radio access technologies such as a 1×RTT transceiver 100, a high-rate packet data (HRPD) transceiver 102, and an evolved high-rate packet data (eHRPD) transceiver 104, each of which can connect to an access network 106. An evolved Node B (eNodeB) transceiver 108 is an LTE network radio network component that connects to an Evolved UMTS Terrestrial Radio Access Network (E-UTRAN) 110. Other radio access technologies such as Wireless Local Area Network (i.e., Wi-Fi), Femto, WiMAX, or any other radio spectrum technology, can use a transceiver shown generally at 112 to connect a user equipment (UE) 134 to the network using a broadband or other access network.

The access network 106 can communicate with an access gateway 116 that implements a combination of functionalities such as a packet data serving node (PDSN), a HRPD serving gateway (HSGW), and a serving gateway (SGW). In operation, the PDSN functionality can be used with 1×RTT 100, the HSGW functionality can be used with HRPD 102 and eHRPD 104, and the SGW functionality can be used with the eNodeB 108. The access gateway 116 can communicate with an anchor gateway 118, which can implement a packet data network gateway (PGW) and a Home Agent (HA), and a mobility management entity (MME) 120. On the access network side, the anchor gateway 118 can also communicate with an evolved packet data gateway (ePDG) 122 that provides connectivity to the WLAN/Femto/other transceiver 112. On the packet core side, the anchor gateway can communicate with the operator's IP service domain 124, the Internet 126, and IP multimedia subsystem (IMS) 128. An authentication, authorization, and accounting (AAA) server/home subscriber server (HSS) 130 can communicate with the access gateway 116, the anchor gateway 118, or both.

The Home Subscriber Server (HSS) 130 can be a master user database that supports IMS network entities that handle calls. The HSS 130 stores subscription-related information (subscriber profiles), performs authentication and authorization of the user, and can provide information about the subscriber's location and IP information. The HSS 130 also maintains binding information on which gateway is currently serving a UE. Even when the UE 134 is detached from the network, the HSS 130 maintains the binding information until the UE 134 re-attaches itself and updates the binding information. The AAA server 130 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA/HSS 130 can communicate with the access gateway 116 for charging purposes.

The LTE communication network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communication network includes the MME 120, SGW 116 and PGW 118 components. In some embodiments, one or more EPC components can be implemented on the same gateway or chassis as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle state UEs, the SGW terminates the down link data path and triggers paging when down link data arrives for the UE. The SGW manages and stores UE contexts, e.g. parameters of the IP bearer service and network internal routing information. The SGW also performs replication of the user traffic in case of lawful interception.

The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 standards (CDMA 1x and EVDO). The PGW may also include processing capability which is able to compress aspects of the packet flow or enable the use of a plurality of transmission protocols which are characterized by have differing computational complexity versus over the air interface efficiency.

The MME resides in the EPC control plane and manages session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN). The MME can also be integrated with 2G/3G elements, such as the SGSN and GGSN. This integration can provide mobility and session management interworking between 2G/3G and 4G mobile networks.

MME 120 is a control-node for the LTE access network. The MME is responsible for UE tracking and paging procedures including retransmissions. MME 120 handles the bearer activation/deactivation process and is also responsible for choosing the SGW for a UE at the initial attach and at time of an intra-LTE handover. The MME also authenticates the user by interacting with the HSS 130. The MME also generates and allocates temporary identities to UEs and terminates Network Access Server (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming UEs.

The ePDG/HeNB 122 is responsible for interworking between the EPC and fixed untrusted non-3GPP access technologies such as a WLAN, WiMAX, LTE metro, and femto-cell access networks. The ePDG/HeNB 122 can use IPSec/IKEv2 to provide secure access to the EPC network. Optionally, the ePDG/HeNB 122 can use Proxy Mobile IPv6 (PMIPv6) to interact with the PGW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 2:
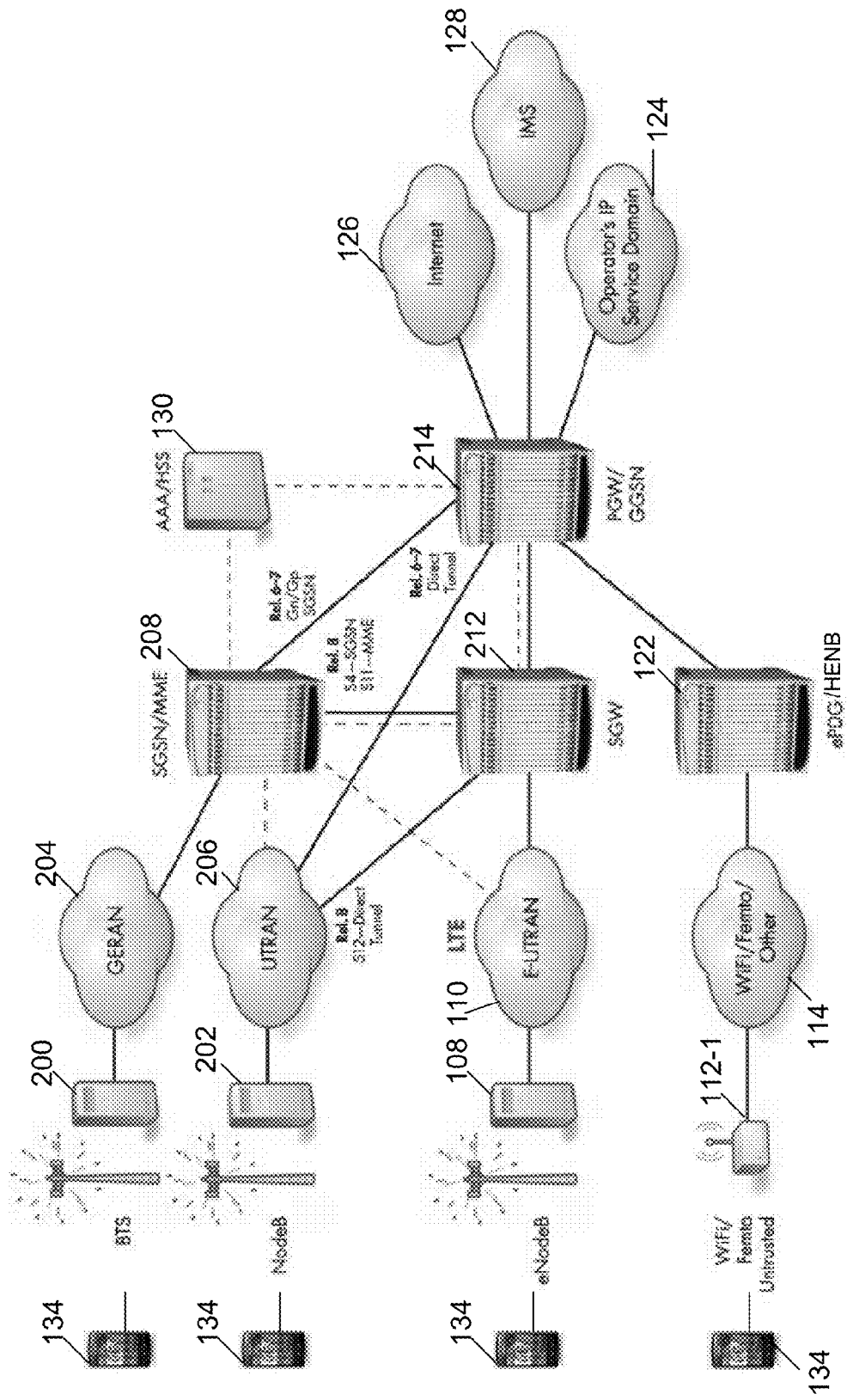

FIG. 2 illustrates a communication system with parallel networks in accordance with legacy universal mobile telecommunications systems (UMTS) network devices in accordance with certain embodiments. The legacy transceivers include base transceiver station (BTS) 200 and NodeB transceiver 202. The BTS 200 can communicate with a GSM EDGE Radio Access Network (GERAN) 204 and the NodeB 202 can communicate with a UMTS terrestrial radio access network (UTRAN) 206. The serving GPRS support node (SGSN) can be implemented on a gateway 208 with a mobility management entity (MME). The GERAN 204 can communicate through the SGSN functionality on gateway 208 to serving gateway (SGW) 212 or gateway GPRS support node (GGSN)/PGW 214. UEs 134 can receive data service via a trusted WLAN network.

In some embodiments, the load information can be transferred to network devices residing in the control plane of the network. For example, network devices such as the mobility management entity (MME), the SGSN, and the Home Agent (HA). These mobility management devices can be involved in the process of assigning resources, managing communication sessions, and managing mobility of user equipment. The problem is that these mobility management devices may not be able to receive load information because of their placement in the network and the interfaces that are setup for the mobility management devices. The load information can include radio access transceiver load information such as transmitter load, available bandwidth, channel usage, transmitter usage, power consumption, memory consumption, and number of user equipment attached.

The load information can be transferred to the mobility management device by adding an interface to the mobility management device to retrieve the load information. The interface can provide communication with the radio access network, such as eNodeBs and nodeBs. Generally, an Evolved Universal Terrestrial Radio Access Network (E-UTRAN) is exposed to cell load information. This load information can be communicated using an interface used to communicate between network devices in the radio access network. For example, the X2 interface can be used. The X2 interface is used to communicate between eNodeBs in LTE networks.

Since the interface is a radio-related interface, the mobility management device is modified to be able to communicate using this radio-related interface. The radio-related interface can be the X2 interface or any other applicable radio access transceiver to radio access transceiver interface that allows the mobility management device to communicate with the radio access transceiver as if it were a radio access transceiver itself. The radio access network equipment when communicating with a mobility management device in the core network would think that the mobility management device was another radio access network component. The mobility management device can follow many of the interfaces' messaging protocols. In doing so, the mobility management device masquerades or impersonates a radio access network transceiver such as an eNodeB. The mobility management device can then use the interface to setup a connection or session with one or more radio access network transceivers to regularly receive load information. The load information can be received periodically or based on events so that the mobility management device can track the current load of various network devices in the radio access network.

In some embodiments, the mobility management device, such as an MME, is able to establish X2 signaling connections with the eNodeBs that it controls. The MME uses the X2 signaling to get radio load information from the eNodeB. The MME can signal to the eNodeBs that it is utilizing the physical resource block (PRB) used by the eNodeB. The eNodeB can then signal physical resource block load information over the X2 interface to the MME. The MME can store the physical resource block load information and determine from the physical resource block the load of the eNodeB. In certain embodiments, X2 interface signaling exchanges can be used to collect the information used to determine the load information. The MME can then monitor the load information and setup thresholds or algorithms to determine when changes are made based on the load information. The MME can then signal other devices in the core network such as gateways that include packet flows to the impacted eNodeBs. The MME can also trigger modifications to packet flows that are destined to the impacted eNodeBs.

The gateway can use the information communicated from the mobility management device to perform operations on the packet flows. These operations include video optimization, TCP optimization, HTTP optimization, or other techniques on the packet flow being carried by the loaded radio network transceiver. In particular, these packet flow optimization techniques are generally characterized as consuming additional computational capabilities to operate and more generally, the degree of computational requirements can be related to the degree of optimization. For example, video optimization techniques may include trans-rating (changing bit rates without changing video formats—typically using the least computation resources), trans-wrapping (changing the format without having to re-encode the video content which uses substantial computational resources) or trans-coding (the full re-encoding of the source video data which is most computationally expensive of the three in this example). The optimization techniques can also involve header compression or other techniques to reduce the load on the radio access transceivers.

In some embodiments, the MME can signal an SGW using the S11 interface regarding the loading conditions. The signaling can include instructions to address loading, the loading information, radio transceiver information that is impacted by loading conditions, or packet flow information that is impacted by loading conditions. The signaling may be proprietary signaling that includes PDP context information or other identifying information so that the packet flows can be identified. This identifying information can include IP addresses. The IP addresses can be obtained by examining the IP address from which the load information was received and the IP address used the radio transceiver to originate GTP-U payload packets.

In certain embodiments, the SGW can signal a PGW using the S5 interface regarding the loading conditions. The signaling can include instructions to address loading, the loading information, radio transceiver information that is impacted by loading conditions, or packet flow information that is impacted by loading conditions. The signaling may be proprietary signaling such as vendor specific messaging or information elements. The SGW can pass the load information onto the PGW in order to trigger the PGW to selectively apply optimization techniques to packet flows. Optimization techniques can be resource intensive to the gateway, so selective application of the techniques based on loading information provides a way to devote resources to the packet flows and radio transceivers that will benefit from the optimizations. In some embodiments, the mobility management device can send the load information or instructions directly using the Gn/Gp interface to PGW or GGSN. Other methods such as tunneling to the gateway or working through another device such as a PCRF can be used as well.

The mobility management device can communicate with the radio transceiver by discovering the radio transceivers and then requesting load information over the radio interface. In the X2 interface, the eNodeBs can be configured to automatically discover one another and setup signaling between neighbors to manage mobility and share loading information. An MME can use this process to establish a signaling relationship with each of the eNodeBs the MME is servicing to obtain load information from the eNodeBs. The MME is in communication with the eNodeBs that it is servicing or managing through the S1-MME interface. Through this interface the MME can obtain information about the eNodeBs such as their identity and location. The MME can then use the identity information about eNodeBs to establish an X2 connection. The MME can send the eNodeB an X2 message to indicate that the MME is in the same resource block and then solicit radio resource status messages from that eNodeB. Once the eNodeB receives from the MME that it is in the same resource block and the MME is requesting radio resource status updates, the eNodeB will send the MME the requested information. In this way, the MME is pretending to be a peer eNodeB, when in fact it is not.

Since the eNodeB thinks that the MME is in fact an eNodeB, the MME may configure the signaling relationship to avoid being selected as a candidate for a handover. The MME can send the eNodeB over the X2 interface a Handover Preparation Failure message in response to Handover Request message from the eNodeB. The MME can also send in an ENB Configuration Update message an indication that the spoofed eNodeB has been powered down. As such, the spoofed eNodeB will not be selected for a handover avoiding potential problems.

Figure 3:
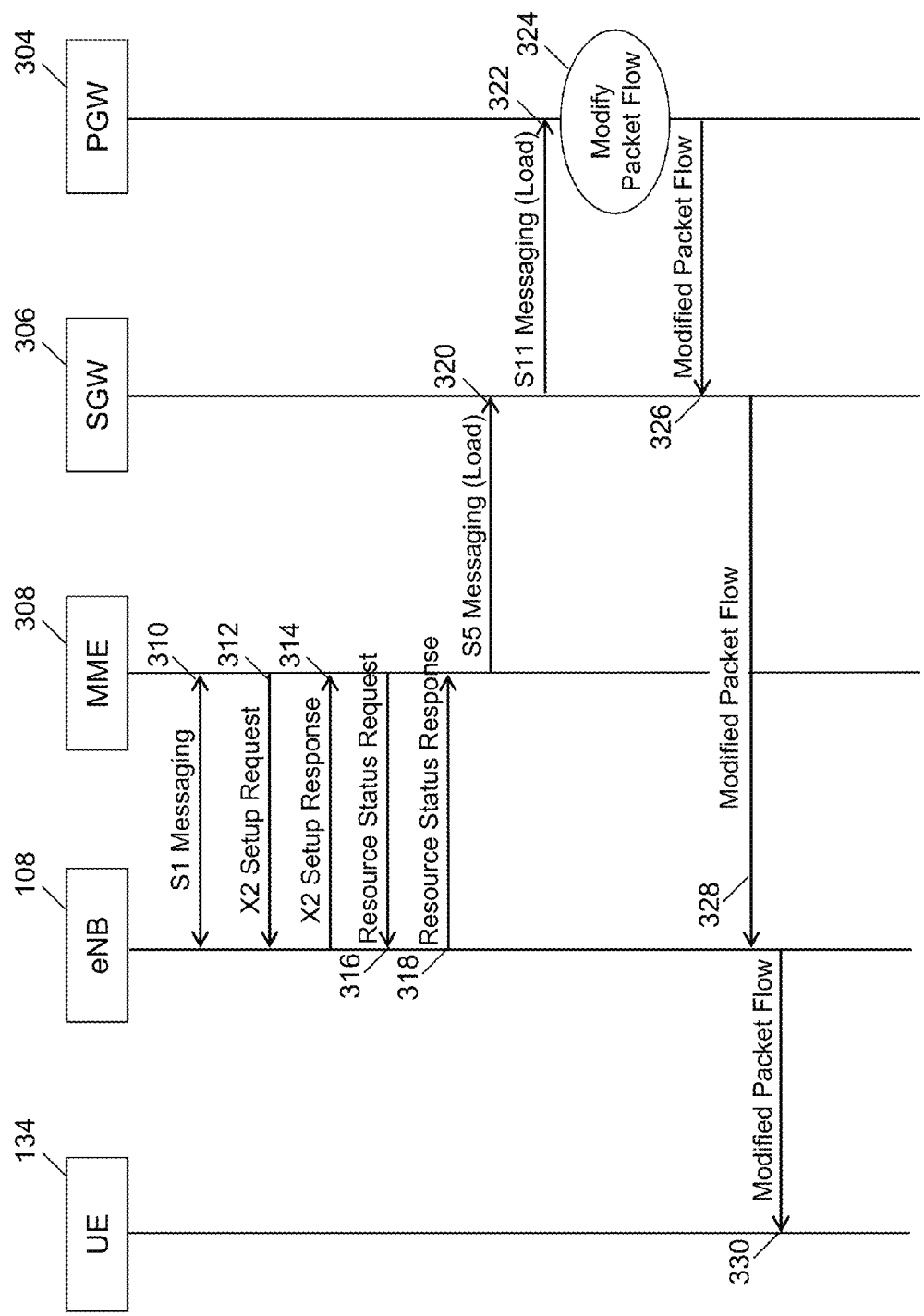
FIG. 3 shows a communication system with parallel networks in accordance with certain embodiments.

FIG. 3 illustrates a signaling diagram to exchange load information in accordance with certain embodiments. FIG. 3 includes user equipment (UE) 134, eNodeB (eNB) 108, MME 308, SGW 306, and PGW 304. MME 308 can include any applicable mobility management device such as MME 120 and MME 208. SGW 306 can include any applicable serving gateway including SGWs 212 and 116. PGW 304 can include any applicable PDN gateway including PGWs 118 and 214. In step 310, eNodeB 108 and MME 308 exchange S1 messaging on the S1-MME interface. The S1 messaging between eNodeB 108 and MME 308 can be used to determine the identity of the eNodeB and setup procedures at the various eNodeB communicating with MME 308. Once configured, MME 308 can send paging requests and other control plane messages to eNodeB 108. The MME 308 can use the information it has regarding eNodeB to spoof an eNodeB for the purposes of obtaining information from the eNodeB.

In step 312, the MME 308 sends an X2 setup request message to eNodeB 108. The X2 setup request message can include configuration information to setup connection signaling between the MME and the eNodeB. In the X2 setup request message, the MME informs the eNodeB that the MME and eNodeB are eNodeB neighbors. Since the MME and eNodeB are identified as neighbors, the X2 interface allows sharing of information. The MME can also instruct the eNodeB that they are sharing the same resource block such as a physical resource block (PRB). In step 314, the eNodeB 108 sends an X2 setup response message to MME 308. The X2 setup response message includes information such as neighboring cells and other information that exchanged to provide application level configuration data used between two eNodeBs to interoperate over the X2 interface. The MME may discard this information or store it for later use.

In step 316, the MME 308 sends an X2 resource status request message to eNodeB 108. The resource status request message is used by an eNB to request the reporting of load measurements to another eNB. The eNodeB 108 upon receiving the resource status request message from the MME 308 can initiate the requested measurement according to parameters set in the message. The MME 308 can request a variety of information in the resource status request message including the radio resource status, the TNL (transport network load) load, the hardware load, the composite available capacity group, and ABS (almost blank subframe) status. The MME can also indicate the requested reporting periodicity from the eNodeB, which will set the time interval between subsequent measurement reports.

In step 318, the eNodeB 108 sends an X2 resource state response message to MME 308. The resource status response message is used by the eNodeB to provide the various load information requested by the other eNB. The eNodeB 108 can provide for each cell information including the radio resource status, the 51 TNL (transport network load) load, the hardware load, the composite available capacity group, and ABS (almost blank subframe) status. The MME may use an algorithm to combine the separate load information provided by the eNodeB 108 into a composite load information. The MME can use the load information received from the eNodeB and/or the composite load information to determine the loading conditions at the various eNodeBs. The composite load information can be a scalar value.

The MME 308 can use algorithms to determine when the loading reaches levels that it makes sense for the MME 308 to take action. The algorithm can include determining a scalar load value upon which it forwards instructions or load based information to other core network devices to modify packet flows. The algorithm can also involve calculations based on the various types of load information received by the MME. In some embodiments, the different types of loading information can trigger different actions by the MME. For example, a high S11 TNL load can trigger a different response than a high hardware load. The algorithm can also be set to trigger different actions based on a combination of different loading factors present at the eNodeB. The MME can map users to the eNodeB in order to provide user level information to other network devices in the core network. The mapping of user information to the eNodeB allows the MME to target packet flows that are headed to an eNodeB based on loading conditions. The MME can determine the mapping based on the IP address of eNodeB and the users that communicating with that IP address. In some embodiments the MME can send the eNodeB IP address to the gateway that is providing packet flow modification and the gateway can modify packet flows based on detecting the eNodeB IP address.

In step 320, MME 308 sends SGW 306 a S5 message that is prompted by the receipt of load information at MME 308 from eNodeB 108. The S5 message can include load information, IP address information, or instructions regarding optimizations to perform on packet flows. The load information can be a scalar value that is included in an vendor specific attribute information element of an S5 message or in a proprietary message. The load information can provide SGW with information regarding the loading conditions present in the radio access network. The IP address information can include the IP addresses of specific users in which to perform certain modifications to their packet flows or the IP address of an eNodeB with certain loading characteristics. The instructions regarding optimization to perform on packet flows can include instructions on how to selectively modify packet flows to alleviate loading conditions. In step 322, the SGW 306 sends PGW 304 a S11 message that is prompted by the receipt of the S5 message in step 320. The S11 message can include load information, IP address information, or instructions regarding optimizations to perform on packet flows.

In step 324, the PGW uses the information based on loading conditions sent from the MME 308 to selectively modify packet flows based on loading conditions. The modifications can include optimizations such as video optimization, TCP optimization, and HTTP optimization. In some embodiments, the MME may provide the PGW with the load information. The PGWs in the core network of an operator likely have consistent rules such that the separate PGWs will react in the same way to the same load information. For example, in GBR (guaranteed bit rate) handling, when the PGW is provided with load information of X, then every receiving PGW can be operable to reduce GBR throughput by a percentage A. When provided with load information of Y at the PGW, the PGW can be operable to reduce the GBR load by percentage B. In this way the coordination of GBR bearers handled by different PGW can be accommodated in a fair manner across the network of PGWs. This example is for GBR bearers, but the same can be true for non-GBR bearers.

In other embodiments the PGW on receiving the signaled load information from the MME 308, may be operable to store the information and delay the operation of packet flow optimization 324 until a request for service has been received from UE 134. For example, subsequent to being signaled about the eNodeB load information, the UE 134 may request the delivery of a video using Adaptive Bite Rate technology by sending a request via PGW 304. The PGW may identify the request as coming from a congested cell and be operable to modify the video manifest file delivered from the video server to the UE 134. In one example, the PGW may remove higher rate versions of the video file from the manifest such that the higher rate video streams cannot be accessed by the UE 134.

Figure 4:
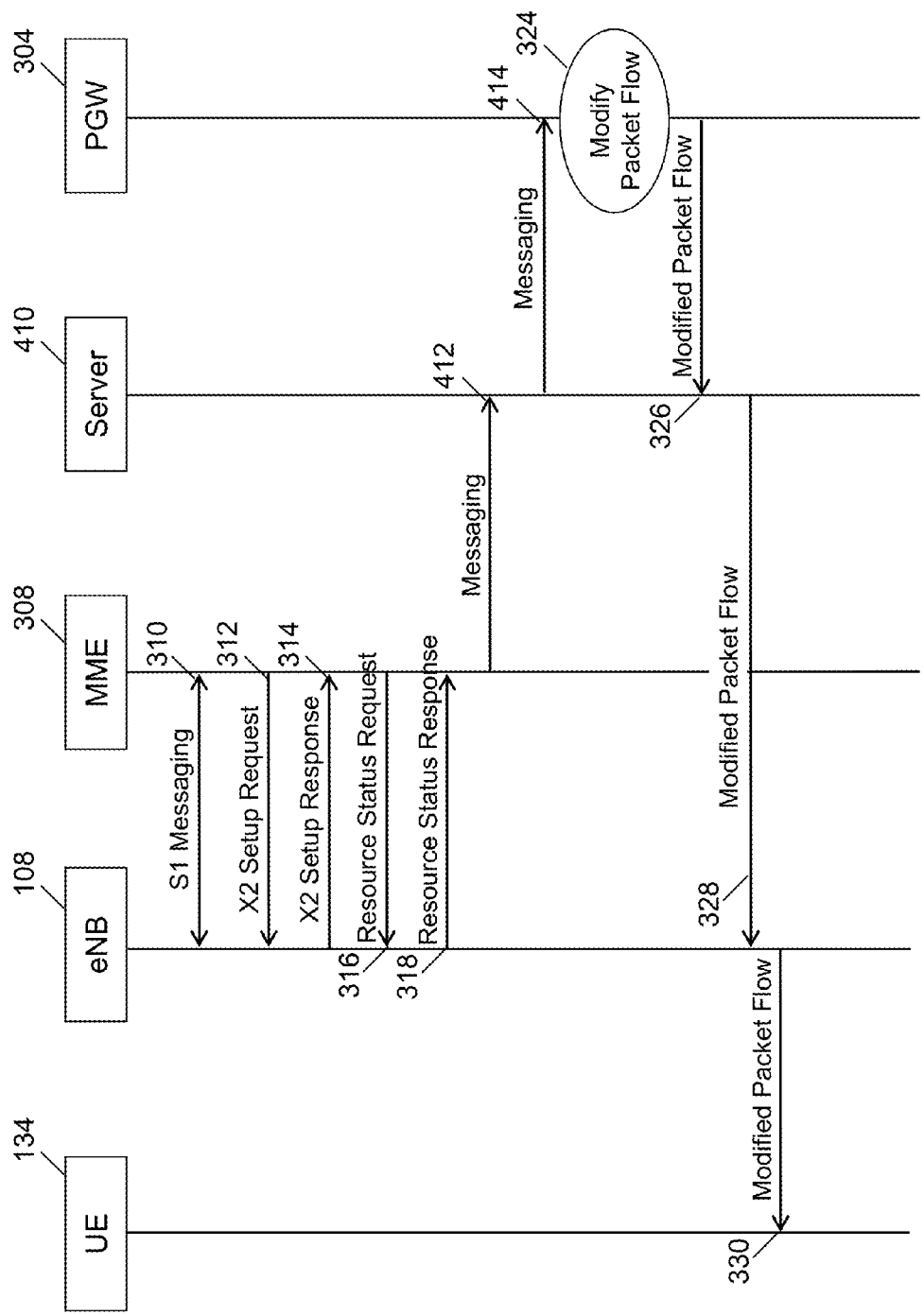
FIG. 4 illustrates a signaling diagram to exchange load information in accordance with some embodiments.

FIG. 4 illustrates a signaling diagram to exchange load information in accordance with some embodiments. FIG. 4 includes user equipment (UE) 134, eNodeB (eNB) 108, mobility management entity (MME) 308, server 410, and PDN gateway (PGW) 304. The server can be a policy charging and rules function (PCRF), a video optimization server, a policy decision function, a policy server, or communication server. The MME 308 can send messaging 412 to server 410 to initiate load information based modifications in the core network. After the MME 308 receives the radio access network load information, the MME can send messaging 412. The MME can use the S7 interface to communicate messaging 412 to a PCRF, when server 410 implements a PCRF. An S6 interface can be used to communicate from the MME to an Home Subscription Service (HSS), when server 410 implements a HSS.

Server 410 can implement a PCRF when the server is responsible for policy and rules for user equipment and network devices in the network. The MME 308 can send policy instructions or load information to the server 410 so that selective optimizations can be made in the core network to radio access transceivers that are experiences certain levels of loading. The server 410 can send messaging 414 to PGW 304 to implement the optimizations on selected packet flows. The packet flows that are selected for modification can be those of user equipment 134 attached to loaded eNB 108.

Figure 5:
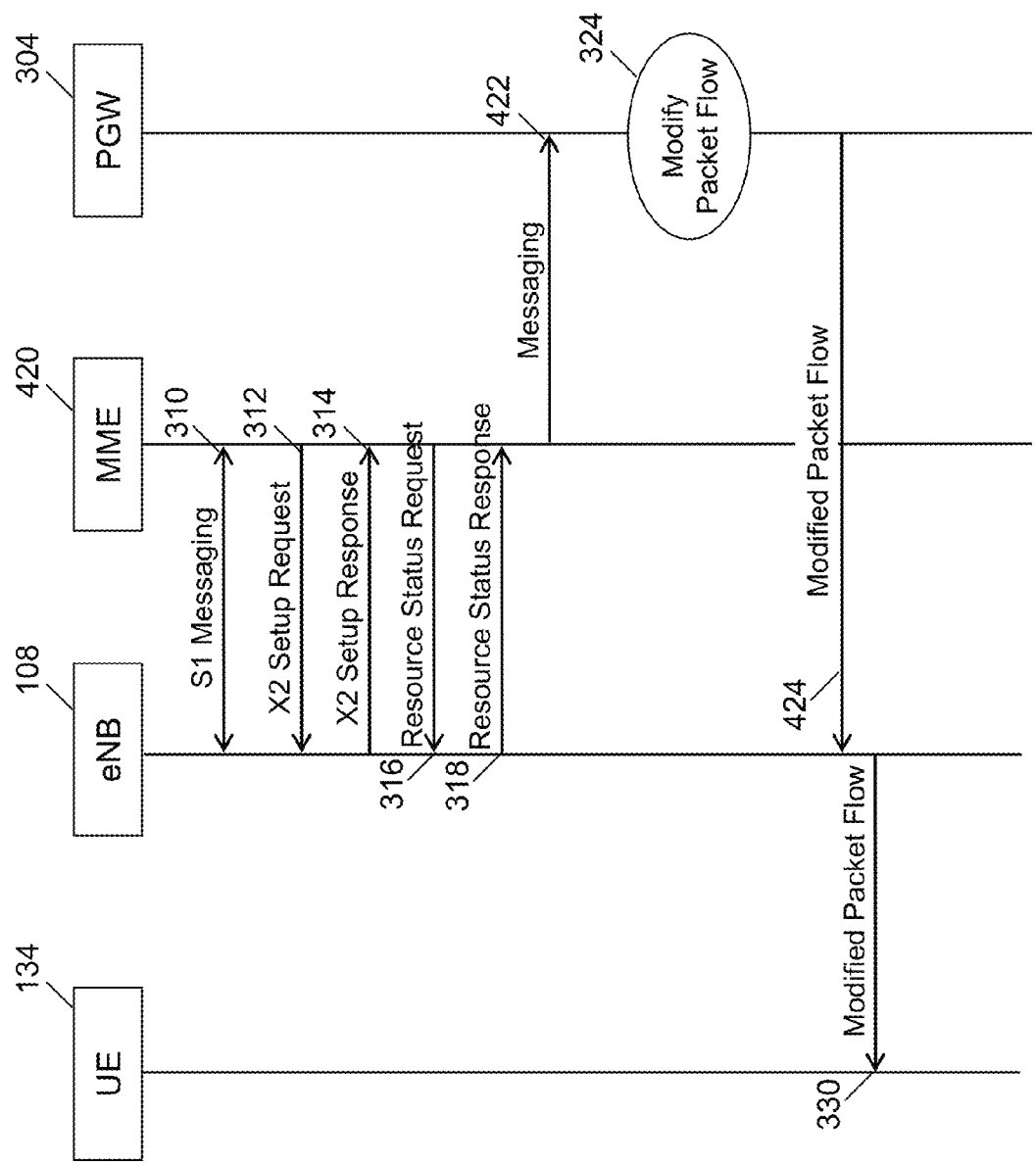
FIG. 5 illustrates a signaling diagram to exchange load information in accordance with some embodiments.

FIG. 5 illustrates a signaling diagram to exchange load information in accordance with some embodiments. FIG. 5 includes user equipment (UE) 134, eNodeB (eNB) 108, mobility management entity (MME) 420, and PDN gateway (PGW) 304. In some embodiments, the mobility management device can communicate directly with the gateway that can provide modifications to selected packet flows. The MME can be co-located with an SGW or a SGSN in order to provide an interface to the PGW. The MME can also be modified to include a direct interface to the PGW. In this embodiment, the MME can be enhanced to spoof an eNodeB to obtain load information and a PGW or SGW to obtain direct access to a PGW. By spoofing other devices, the non-standard MME can use aspects of standardized interfaces to provide additional functionalities. The MME 420 can communicate with PGW 304 directly in step 422. This can be over the Sxx interface, a specialized interface, or using standardized interface in an unanticipated way. The MME 420 can send the PGW 304 load information or instructions so that PGW 304 can modify select packet flows in step 324. The modified packet flows are then communicated to eNodeB 108.

The load information that is obtained by the mobility management device can be used for other operations in the core network as well. This can include providing the load information to user equipment so that the user equipment can decide between parallel networks. Additionally, the core network devices can use the load information to try and shift user equipment to less loaded radio transceivers. For example, the core network can suggest to one or more user equipment that they attach to nearby wireless local area network or femto network instead of the cellular radio access network. If the mobility management device can access the loading levels of parallel networks, than the mobility management device can steer applicable equipment to a less loaded radio transceiver. This can benefit both the user equipment that moves to a new radio transceiver, but also those user equipment that remain on the loaded radio transceiver. The remaining user equipment can benefit from the less loaded conditions that occur once one or more user equipment attach to a parallel network. Additionally, the user equipment can be provided with information regarding loading at each of the parallel networks so that the user equipment can avoid joining a radio transceiver that is already quite loaded.

Figure 6:
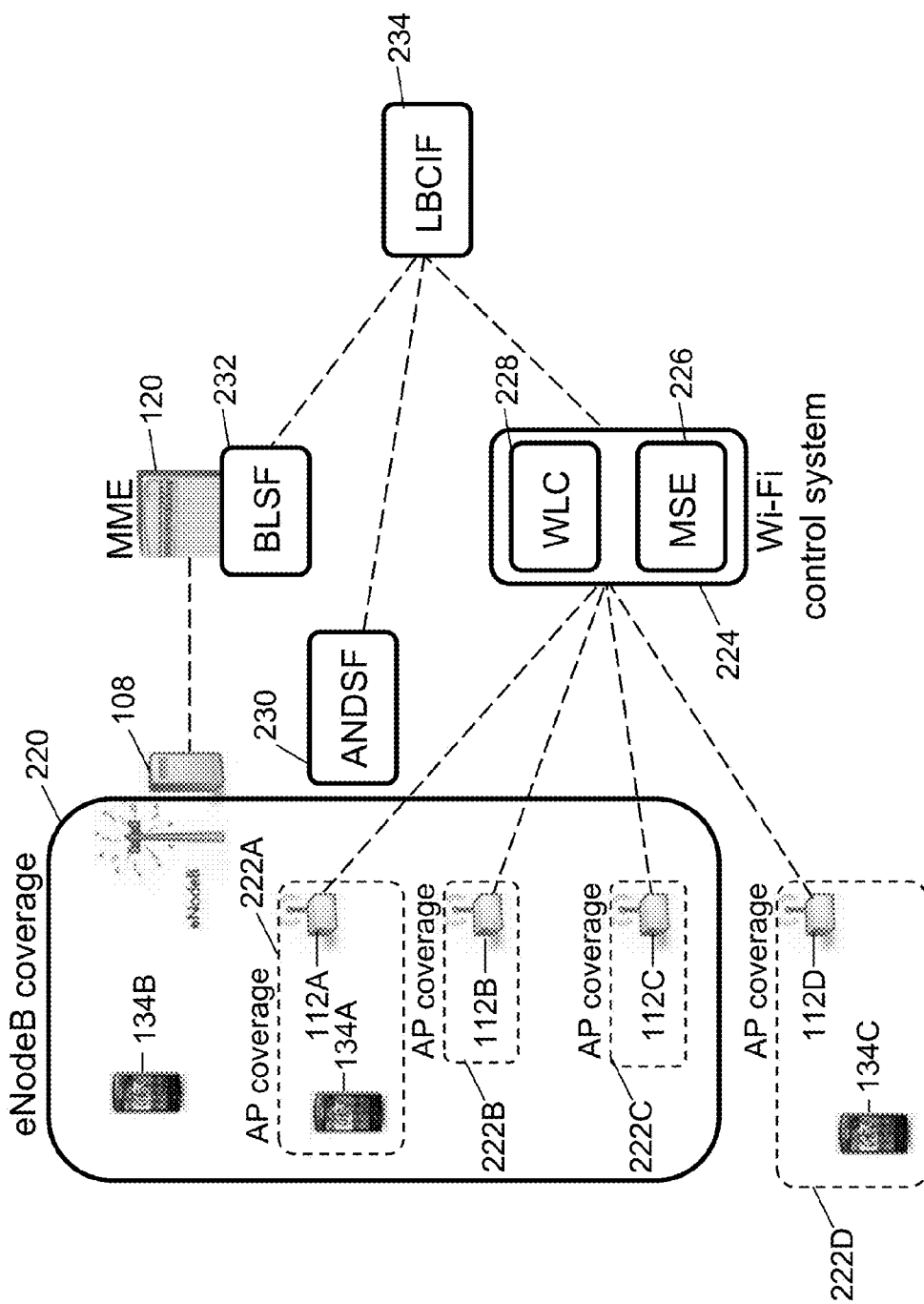
FIG. 6 shows a communication system with parallel networks in accordance with certain embodiments.

FIG. 6 shows a communication system with parallel networks in accordance with certain embodiments. FIG. 6 has a plurality of UEs 134A-134C; a cellular network that includes a base station 108, for example, an evolved Node B (eNodeB) transceiver, a service area 220 of the base station 108, an enhanced MME 120, and a base station load function (BSLF) 232; a wireless local area network (WLAN) that includes a plurality of access points (APs) 112A-112D, service areas 222A-222D of the plurality of APs 112A-112D, a WLAN control system 224 that includes a WLAN controller 228 and a mobility services engine (MSE) 226; a central node called a location based congestion identification function (LBCIF) 234, which is configured to communicate with both the cellular network system and the WLAN system; and an access network discovery and selection function (ANDSF) 230 in an Evolved Packet Core (EPC).

The BSLF 232 can be a part of cellular network's mobility unit, for example, an MME 120. A cellular network is a radio network with multiple transceivers, where each transceiver provides communication to a localized service area called a cell. The cellular network can include LTE networks, HSPA+ networks, and UMTS networks, for example. The size of a cell can vary depending on the transceiver. A macro cell transceiver is typically used by service providers to provide coverage over about a five kilometer distance.

The ANDSF 230 is typically deployed as a stand-alone network device that is accessible by UE 134. The ANDSF 230 can be co-located with the LBCIF 234. In the case of a trusted WLAN, the WLC 228 is located in the WLAN access network. If the trusted WLAN is operated by the cellular network operator, the WLC 228 can also be located in an MME 120.

The WLC 228 and the LBCIF 234 can communicate using a Simple Object Access Protocol (SOAP) or a Representational State Transfer (REST) protocol. Likewise, the BSLF 232 and the LBCIF 234 can communicate using the SOAP or the REST protocol, and the LBCIF 234 and the ANDSF 230 can communicate using the SOAP or the REST protocol.

The WLAN controller 228 can include a wireless LAN controller (WLC) 228. A WLC 228 can perform traditional roles of access points, such as association or authentication of wireless clients. APs 112A-112C, also called access points, can register themselves with the WLC 228 and tunnel management and data packets to the WLC 228, which then switches the packets between the user equipment and the wired portion of the network. WLC 228 can be in charge of the configuring the WLAN. WLC 228 can provide configuration information to the APs 112A-112C so that the APs 112A-112C can act as a wireless interface to the UEs 134.

The APs 112A-112C can be equipped with antennas that are configured to transmit and receive data. For example, the APs 112A-112C may transmit video or audio traffic and receive acknowledgements. In one embodiment, the APs 112A-112C can communicate in accordance with IEEE 802.11 standard, including for example, IEEE 802.11n and 802.11k. The APs 112A-112C may transfer video or other forms of high data rate traffic such as audio, or any other type of data traffic.

An ANDSF 230 is configured to assist UEs to discover non-3GPP networks such as WLAN or WiMax. To this end, the ANDSF 230 can be configured to provide, to a UE, policy information regarding routing, mobility and discovery. The policy information can include an inter-system mobility policy, which indicates network selection rules in case only one network is available, (e.g., cellular or WLAN), an inter-system routing policy, which indicates network selection rules in case more than one network is available (e.g., both cellular and WLAN), and discovery information that lists the networks that may be available to the UE and any candidate information about the networks. UEs can register with the ANDSF 230 to receive service from the ANDSF 230.

In certain embodiments, an AP 112 can broadcast its data load condition to UEs 134 (or all the UEs in the AP's service area) using a Quality of Service Basic Service Set (QBSS) load element. The QBSS load element is a part of beacon frames generated by APs and contains the data load information associated with the APs. The QBSS load element can include three parameters: station count, channel utilization, and available admission capacity. The station count can indicate the total number of UEs currently associated with an access point. The channel utilization rate can indicate the normalized value of the total channel utilization which gives the percentage of the time the channel is sensed to be busy using either the physical or virtual carrier sense mechanism of the access point. The available admission capacity can indicate the amount of time that can be used by explicit admission control. A user equipment can use the QBSS load element parameters to decide to which of the available access points to attach.

The communication system in FIG. 6 has a cellular network and a WLAN operating in parallel. Each network can have a plurality of service areas. A service area is often served by a wireless interface, such as a base station 108 or an AP 112. For example, a cellular network can include multiple service areas, each service area served by a base station 108; a WLAN can include multiple service areas, each service area served by an AP 112. In certain embodiments, service areas in different networks can overlap. For example, in FIG. 3, the base station's service area 220 overlaps with the APs' service areas 222A-222C. If a UE 134A is in an area covered by both WLAN and a cellular network, then the UE 134A can attach to one of the overlapping networks for network services.

In certain embodiments, the cellular network and the WLAN are configured to collect their own network condition information. The network condition information can include information on the network configuration and the network usage. For example, the network condition information can include the data load information, which indicates the amount of data being handled by one or more of service areas in a network and/or the amount of additional data traffic that could be handled by one or more of service areas in a network. The network condition information can also include the geo-location of wireless interfaces in a network and a list of UEs currently served by one or more service areas in a network and, if available, the geographic position of the UEs. In certain embodiments, the network condition information associated with a cellular network can be collected by a BSLF 232 in a MME 120. In certain embodiments, the network condition information associated with a WLAN can be collected by the WLC 228 in the WLAN control system 224.

The cellular network and the WLAN can share the collected network condition information with a central node 234. The central node 234, in turn, can retrieve the data load information from the received network condition information, and deliver the retrieved data load information to UEs 134. There can be at least two ways to deliver the data load information to UEs 134: (1) via a WLC 228 using an enhanced 802.11k signaling or (2) via an ANDSF 230 using an IP signaling. For example, in the first option, the central node 234 can deliver the data load information to the WLC 228. In turn, the WLC 228 can deliver the data load information to the AP 112. The AP 112 can subsequently broadcast the data load information to the UEs in the AP's service area. In certain embodiments, the AP 112 can broadcast the information as an enhanced-Quality of Service Basic Service Set (e-QBSS) load element. In the second option, the central node 234 can deliver the relevant data load information to the ANDSF 230, and the ANDSF 230 can relay the data load information to the UE 134. These options allow the UE 134 to receive the network data load information of both the cellular network and the WLAN without disconnecting from the currently attached network.

In certain embodiments, the central node 234 can deliver only relevant portion of the data load information to UEs 134. For a UE 134, the relevant data load information can include the data load information of wireless interfaces that are capable of serving the UE 134. To determine which wireless interfaces can serve the UE 134, also called candidate wireless interfaces, the central node 234 can analyze the location of wireless interfaces. For example, if a UE 134A is attached to an AP 112A, the central node 234 can identify the serving AP 112A as one of the candidate wireless interfaces. To find additional wireless interfaces that can also serve the UE 134, the central node 234 can use the location information of the serving AP 112A and the location information of other wireless interfaces. For example, if a particular wireless interface is physically proximate to the serving AP 112A so that the service are of a particular wireless interface includes that of the serving AP 112A, the central node 234 can identify the particular wireless interface as one of the candidate wireless interfaces. In some embodiments, if the service coverage of the particular wireless interface overlaps with that of the serving wireless interface, the central node 234 can identify that the particular wireless interface as one of the candidate wireless interfaces.

The UE 134 can use the received data load information to determine to which wireless interface to attach. In other words, the UE 134 can use the data load information to determine whether to remain attached to the current wireless interface or to disconnect from the current wireless interface and attach to a wireless interface with less congestion and/or with more available resources. In certain embodiments, the UE 134 can also analyze additional information to decide to which wireless interface to connect. For example, the UE 134 can use one or more of the following: the load condition associated with the wireless interfaces, the wireless signal strengths associated with the wireless interfaces, and a configuration status on the UE 134 indicating whether the UE 134 favors the cellular network or the WLAN.

In certain embodiments, the central node 234 can periodically deliver the data load information to UEs. This way, UEs can attach to a network in a better network condition in substantially real-time. In other embodiments, the central node 234 can deliver the data load information in response to certain triggering events. For example, a central node 234 can analyze the received network condition information to determine if any of the service areas in the parallel networks are congested or heavily utilized. If one of the service areas is congested or heavily utilized, the central node 234 can identify the UEs currently served by the congested service area and the wireless interfaces that can also serve the congested service area. Subsequently, the central node 234 can send, to the identified UEs 134, the data load information associated with the identified wireless interfaces. This way, the identified UEs can disconnect from the congested service area, determine which of the wireless interfaces to connect to, and attach to the determined wireless interface.

In certain embodiments, the BSLF 232 can identify the physical location of a base station 108. To identify the physical location of a base station 108, the BSLF 232 (or the MME 120 hosting the BSLF 232) can send a location request to the base station 108. The location request can be sent over an S1 interface using an S1 application protocol. Upon receiving the location request, the base station 108 can obtain its positioning information. In certain embodiments, the base station 108 can use a global positioning system (GPS) to obtain its positioning information. Subsequently, the base station 108 can send a location reply to the BSLF 232. The location reply can include the physical location identifier of the base station 108, which can be represented in terms of GPS coordinates or geographic latitudes and longitudes. The location reply can be sent over an S1 interface using an S1 application protocol.

In certain embodiments, the BSLF 232 can also identify the physical, geographic location of UEs 134. For example, the BSLF 232 (or the MME 120 hosting the BSLF 232) can send a UE positioning request to a base station 108. The base station 108 can identify the UEs 134 attached to the base station 108 and determine the location of the attached UEs 134. Then the base station 108 sends a UE positioning response to the BSLF 232, including physical location identifiers of UEs 134 served by the base station 108.

When the LBCIF or central node 234 receives the cellular network condition message and the WLAN condition message, the central node 234 can decide whether to send the received data load information to one or more UEs 134 or not. In certain embodiments, the central node 234 can be configured to send the received data load information to UEs 134 periodically. To this end, the central node 234 can monitor a timer and determine whether a predetermine amount of time has passed since the central node 234 sent the data load information to the UEs 134.

In other embodiments, the central node 234 can be configured to send the received data load information in response to certain triggering events. For example, a central node 234 can analyze the received network condition information to determine if any of the service areas in the parallel networks are congested or heavily utilized. If one of the service areas is congested or heavily utilized, the central node 234 can identify the UEs currently served by the congested service area and the wireless interfaces that can also serve the congested service area. Subsequently, the central node 234 can send, to the identified UEs 134, the data load information associated with the identified wireless interfaces. This way, the identified UEs can disconnect from the congested service area, determine which of the available wireless interfaces to connect to, and attach to the determined wireless interface.

In certain embodiments, if the UE 134 is attached to the cellular network, the central node 234 may be aware of the physical location of the UE 134. For example, the central node 234 can receive the physical location of the UE 134 from the BSLF 232 as part of the network condition information. In this case, the central node 234 can identify candidate wireless interfaces for the UE 134 by analyzing the location of the UE 134, the location of wireless interfaces, and the average size of service areas for each type of wireless interfaces. If the physical distance between the UE 134 and a particular wireless interface is small such that the UE 134 is within the service area of the particular wireless interface, the central node 234 can include the particular wireless interface as one of the candidate wireless interfaces. In other embodiments, the central node 234 can identify the candidate wireless interfaces by querying the identity database. The central node 234 can query the identity database to return all available wireless interfaces at the UE's location and use the returned result as the candidate wireless interfaces.

Once the central node 234 identifies candidate wireless interfaces, the central node 234 prepares data load information to send to the UE 134. Because the WLC 228 already has the data load information associated with the APs, the central node 234 can only prepare the data load information associated with candidate base stations. In step 6, the central node 234 sends a cellular load message to the WLC 228. The cellular load message includes the data load information associated with candidate base stations 108.

In certain embodiments, the UE 134 can also analyze additional network condition information to decide to which wireless interface to connect. The additional network condition information can include one or more of the following: the load condition associated with the candidate wireless interfaces, the wireless signal strength associated with the candidate wireless interfaces, and a configuration status on the UE 134 indicating whether the UE 134 favors the cellular network or the WLAN. The configuration status can be represented numerically. For example, the configuration status can be between 0 and 1, 0 indicating that the UE 134 should always attach to a base station, and 1 indicating that the UE 134 should always attach to an AP. The received data load information and the additional network condition information can be combined to generate a selection score using a selection algorithm. For example, the selection algorithm can have two inputs, the received data load information and the additional network condition information, where the received data load information would adaptively modify the selection algorithm. For instance, the selection algorithm can include a function with hysteresis and the received data load information can determine the threshold in the hysteresis function.

Figure 7:
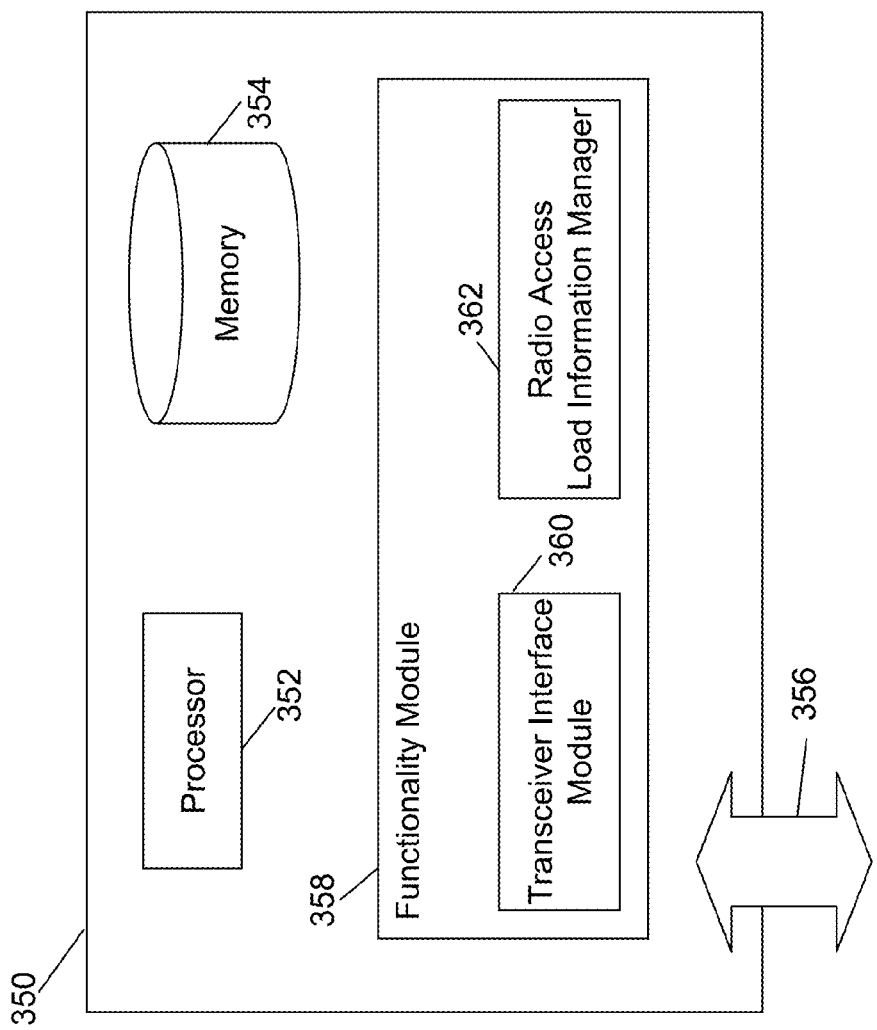
FIG. 7 illustrates a logical view of a network device in accordance with certain embodiments.

FIG. 7 illustrates a logical view of a network device 350 in accordance with certain embodiments. The network device 350 can include a processor 352, a memory 354, an interface 356, a functionality module 358, a transceiver interface module 360, a radio access load information manager 362. The network device 350 can implement a mobility management device or any other applicable function using the hardware of the network device. The functionality module 358 includes the logic that in conjunction with the processor 352 and memory 354 can implement the functionality. The functionality module can be implemented in software or hardware such as microcode, field programmable gate arrays, or application specific integrated circuits. The functionality module includes the instructions and information that performs functionalities expected of a particular network functionality. The functionalities implemented by the functionality module 358 include an MME, an SGSN, an SGW, a PGW, a GGSN, a packet data serving node (PDSN), a home agent (HA), or any other applicable functionality.

An interface 356 can provide an input and/or output mechanism to communicate with other network devices. The interface 356 can implement the X2 interface in conjunction with the transceiver interface module 360. The interface 356 can provide a mechanism for communicating with network devices such as the serving gateway (SGW), the PDN gateway (PGW), and the PCRF as well as radio access network devices such as the eNodeB. The interface 356 can be implemented in hardware to send and receive signals in a variety of mediums, such as optical, copper, and wireless, and in a number of different protocols some of which may be non-transient. The transceiver interface module 360 can control how the network device communicates over the interface 356.

The transceiver interface module 360 can support the communication protocols used by the functionality module 358. The transceiver interface module 360 can be logic that includes the rules used to specify how to form and read messages in a particular protocol and how to use the interface to communicate with another network device. The transceiver interface module 360 can be used to communicate using the X2 protocol over interface 356. The transceiver interface module 360 can include modifications in the X2 protocol to allow a network devices such as an MME to masquerade as an eNodeB for the purposes of obtaining radio transceiver information.

The network device 350 can include a radio access load information manager 362. The radio access load information manager 362 can be implemented as a module that uses memory 354 and runs on processor 352. The module can be implemented using logic that is implemented in any combination of hardware or software. The radio access load information manager 362 can collect or track relevant information radio access network transceivers that can be later used in establishing an interface with the radio transceivers in the network. For example, the radio access load information manager 362 can track identity and location information about radio transceivers in the access network. This identity and location information can then be used by the transceiver interface module 360 to establish a connection, such as an X2 interface connection. In some embodiments, the radio access load information manager 362 can provide the information to the transceiver interface module 360 in order to create an X2 message to indicate that the network device is in the same resource block and to solicit radio resource status messages from the radio transceiver.

When the transceiver interface module 360 receives radio resource status update messages from radio transceivers, the transceiver interface module 360 can send these to the radio access load information manager 362. The radio access load information manager 362 can store the radio transceiver load information in memory 354. The stored radio transceiver load information can be organized by the radio access load information manager 362 for use by other network devices in the network such as gateways. The collected load information from the radio transceivers can be aggregated and organized and set to specific gateways in the core network that are handling transmissions to the radio transceivers. In some embodiments, the radio transceiver load information manager 362 can send the information to transceiver interface module 360 to send over interface 356 to one or more gateways in the core network.

The radio access load information manager 362 can also be setup to send radio load information updates to gateways when specific events occur. For example, algorithms can be used in the radio access load information manager 362 to track the loading of the various radio transceivers and messages are sent to the gateways only when certain thresholds or conditions are present. This can include when the loading of particular gateway reaches a certain value. The radio access load information manager 362 can also send instructions based on the loading value such as to engage in packet data optimizations to that radio transceiver. In this way, the gateway can just receive messages when changes are made and processing can be reduced. In some embodiments, the load information is communicated to the gateway and the gateway determines how to respond to the load information.

The processor 352 can be one or more integrated circuits that are a multipurpose, programmable, clock-driven, register-based electronic device that accepts binary data as input, processes it according to instructions stored in its memory, and provides results as output. In some embodiments, the processor 352 can be constructed for a specific purpose such as a network processing unit to perform specific tasks such as inspecting received radio load information messages or processing control plane messaging.

Memory 354 can be any type of computer readable medium such as random access memory (RAM), programmable read-only memory (PROM), a field programmable gate array (FPGA), flash memory, optical disk drive, or magnetic storage medium. The memory 354 can be used to store computer programs or logic that can be run on processor 352. The memory 354 can also store information such as data structures and other data that is used for collecting and providing load information.

Figure 8:
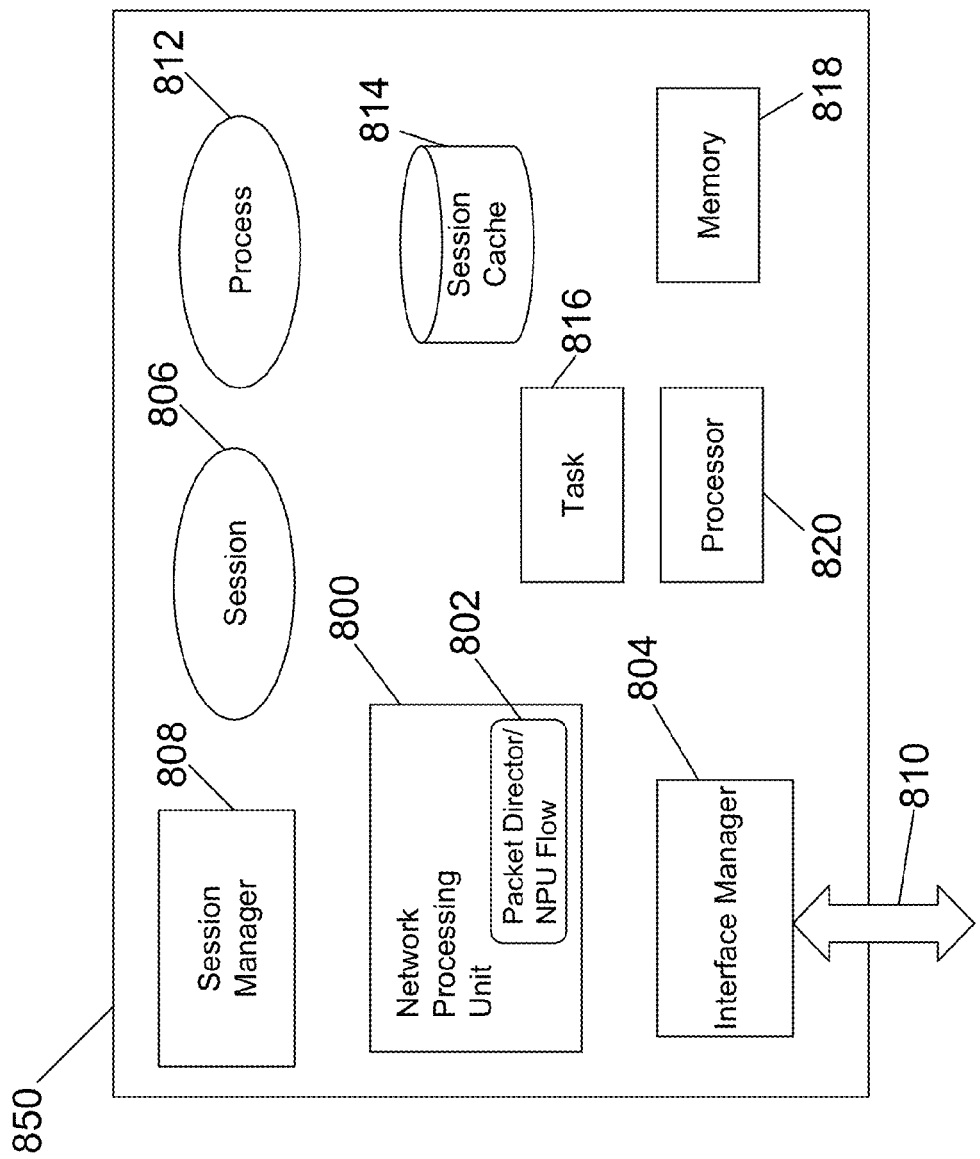
FIG. 8 illustrates a logical view of a gateway that receives radio load information and performs optimizations on packet traffic in accordance with certain embodiments.

FIG. 8 illustrates a logical view of a gateway that receives radio load information and performs optimizations on packet traffic in accordance with certain embodiments. In FIG. 8, gateway 850 includes a network processing unit (NPU) 800, a packet director/NPU flow 802, a interface manager 804, sessions 806, a session manager module 808, an input/output interface 810, a process 812, a session cache 814, tasks 816, memory 818, and a processor 820. Interface 810 includes one or more physical connections that can be either wired or wireless to communicate information to and from NPU 800. Session manager module 808 works with interface 810 to provide signals to communicate information from NPU 800 and to receive information from interface 810.

The NPU 800 receives electrical or optical signals on interface 810 from the access networks and transmits network information such as media fragments, data packets, and mobile system information to mobile devices. The NPU 800 is capable of performing deep packet inspection to modify media protocols. Deep packet inspection includes a form of data packet analysis that examines a data packet to obtain information as the data packet is processed. The processor 820 can be one or more integrated circuits that are a multipurpose, programmable, clock-driven, register-based electronic device that accepts binary data as input, processes it according to instructions stored in its memory, and provides results as output. In some embodiments, the processor 820 can be constructed for a specific purpose such as a network processing unit 800 to perform media protocol modification or another specific task.

Memory 818 can be any type of computer readable medium such as random access memory (RAM), programmable read-only memory (PROM), a field programmable gate array (FPGA), flash memory, optical disk drive, or magnetic storage medium. The memory 818 can be used to store computer programs or logic that can be run on processor 820. The session manager 808 can be implemented using a combination of hardware and software for tracking, managing, and processing a subscriber's data flows in conjunction with session 306. A session 306 can be dedicated to a particular subscriber or user equipment to perform or monitor specific packet flows or tasks 316. The session manager 808 can obtain subscriber information including radio transceiver load information on interface 810. When radio transceiver load information is received or instructions regarding the radio transceiver load information are received, the session manager can direct the corresponding sessions to modify the packet flows that are being handled by the session.

When a user equipment connects to the mobile wireless network through a radio access transceiver, a mobile subscriber session 806 can be created between the user equipment and the gateway. In FIG. 8, the session manager 808 manages a plurality of mobile subscriber sessions 806 and may also authenticate the subscriber with a policy charging and rules function (PCRF) through a mobile subscriber session 806 with the user equipment. The result is that the PCRF can use the interface 810 to send mobile system information, including policy information and instructions regarding QoS and services to be provided to the subscriber's data, to the gateway. In some embodiments, the PCRF can also send radio transceiver load information received from the mobility management device. The session manager 808 can use this mobile system information in managing sessions 806.

The gateway includes the capabilities to inspect packets with a network processing unit and to modify packet information that is relevant for changing the congestion at a congested radio transceiver. The gateway can use information obtained through deep packet inspection to correlate the received radio access transceiver load information with a particular subscriber and a specific packet flow. The process can work by receiving data traffic on interface 810. The demux manager 804 manages the interface 810 and sorts the data traffic for further processing. In some embodiments, the demux manager 804 provides a rough sorting of traffic into different types of traffic based on shallow packet inspection. This can include reviewing the outermost header information.

The demux manager 804 can then pass the data traffic to the network processing unit 800 for further processing and deep packet inspection. The deep packet inspection can involve matching the higher layer packet headers (e.g., layers 3-7) against criteria to direct and sort the data packets. For example, deep packet inspection of the data traffic can determine when a data packet includes packets for a specific radio transceiver. In some embodiments, a packet director/NPU flow can be setup to sort out specific packet flows. A flow can be setup for sorting and further inspecting data packets. For example, a flow can be setup to collect the packets that are received at the gateway that are going to a congested radio transceiver. Depending on the embodiment, multiple flows can be setup in parallel to sort the packet flows on a per subscriber basis or a flow can be setup to modify the packet flows from multiple subscribers that are communicating from a particular radio transceiver. Once the packet flows are identified by the flow, then the packet flows can be modified according to policy or rules in the gateway to ease the burden on the particular radio transceiver.

The flows can be setup to modify media requests (e.g., an adaptive bitrate request) according to rules that are configured when the flow is setup in the network processing unit. This can include setting the request message to a specific bit rate for the requested fragment of content. Setting the processor flow to modify the requests meeting certain requirements is useful to minimize processing latency. For example, streaming a movie can result in the generation of a number of media requests. Setting up the processor flow can allow the requests to be modified shortly after receipt in hardware to correspond to network policy parameters and subscriber preferences. The flow for a subscriber can be modified based on network level information to update the modifications made to received requests. The flow can be modified based on performance conditions, policy settings, and subscriber conditions. The performance conditions can include fluctuations in the performance of a wireless network.

User Equipment and Network Device

The UE 134 described above can communicate with a plurality of radio access networks using a plurality of access technologies and with wired communication networks. The UE 134 can be a smart phone offering advanced capabilities such as word processing, web browsing, gaming, e-book capabilities, an operating system, and a full keyboard. The UE 134 may run an operating system such as Symbian OS, iPhone OS, RIM's Blackberry, Windows Mobile, Linux, Palm WebOS, and Android. The screen may be a touch screen that can be used to input data to the UE 134 and the screen can be used instead of the full keyboard. The UE 134 may have the capability to run applications or communicate with applications that are provided by servers in the communication network. The UE 134 can receive updates and other information from these applications on the network.

The UE 134 also encompasses many other devices such as televisions (TVs), video projectors, set-top boxes or set-top units, digital video recorders (DVR), computers, netbooks, laptops, and any other audio/visual equipment that can communicate with a network. The UE 134 can also keep global positioning coordinates, profile information, or other location information in its stack or memory. The UE 134 can have a memory such as a computer readable medium, flash memory, a magnetic disk drive, an optical drive, a programmable read-only memory (PROM), and/or a read-only memory (ROM). The UE 134 can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The UE 134 can also provide a variety of user interfaces such as a keyboard, a touch screen, a trackball, a touch pad, and/or a mouse. The UE 134 may also include speakers and a display device in some embodiments.

The radio-related interface and associated optimizations can be implemented, at least in part, in one or more network devices in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (AS-NGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA).

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintaining traffic management for the mobile node. The offload gateway can be implemented as any combination of the following including an xGSN, an xGW, an xGW-SGW, and an xGW-PGW.

Figure 9:
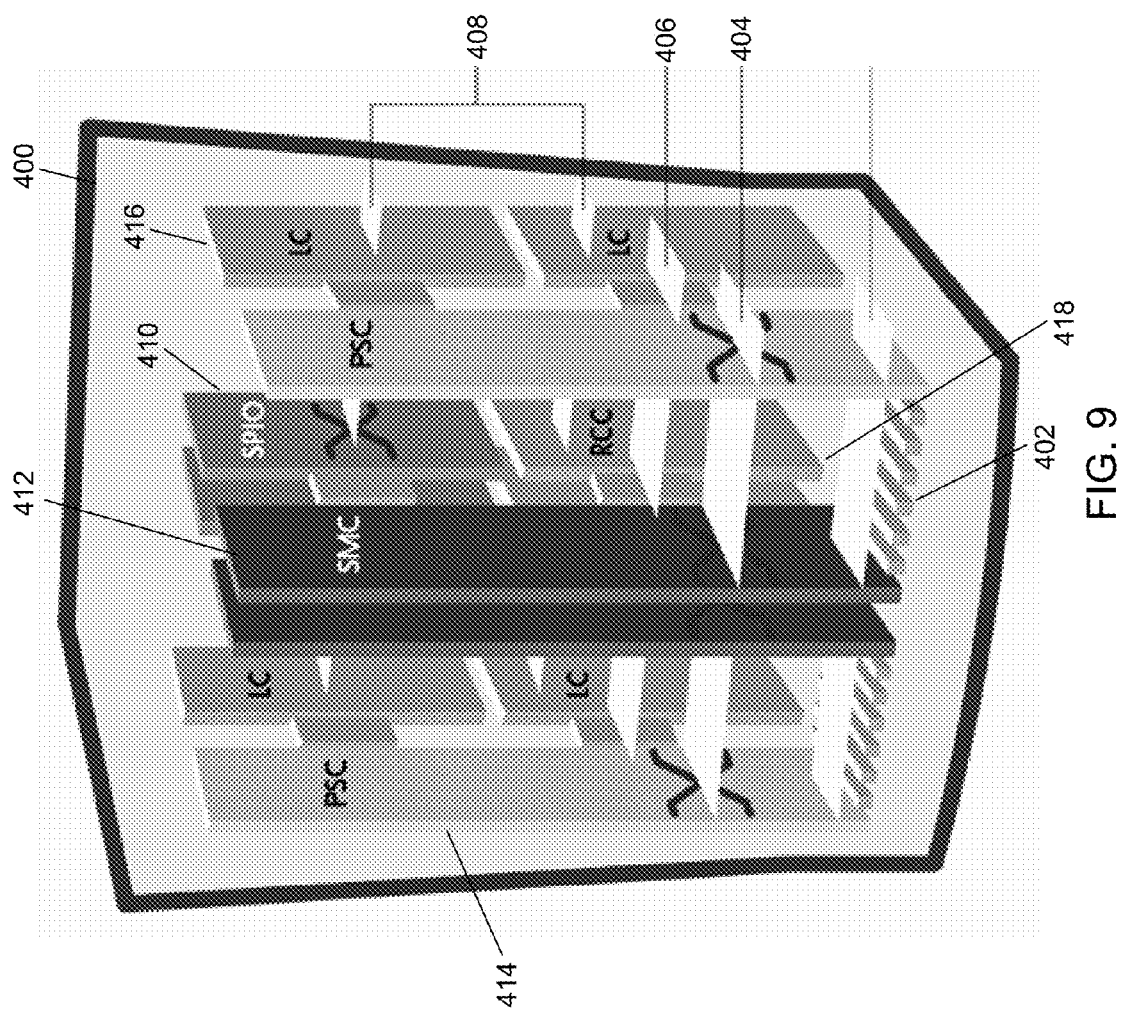
FIG. 9 illustrates a network device in accordance with certain embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 9 illustrates the implementation of a network device in accordance with some embodiments. The network device 400 includes slots 402 for loading application cards and line cards. A midplane can be used in the network device to provide intra-network device communications, power connections, and transport paths between the various installed cards. The midplane can include buses such as a switch fabric 404, a control bus 406, a system management bus, a redundancy bus 408, and a time division multiplex (TDM) bus. The switch fabric 404 is an IP-based transport path for user data throughout the network device implemented by establishing inter-card communications between application cards and line cards. The control bus 406 interconnects the control and management processors within the network device. The network device management bus provides management of system functions such as supplying power, monitoring temperatures, board status, data path errors, card resets, and other failover features. The redundancy bus 408 provides transportation of user data and redundancy links in the event of hardware failures. The TDM bus provides support for voice services on the system.

The network device supports at least four types of application cards: a switch processor I/O card (SPIO) 410, a system management card (SMC) 412, a packet service card (PSC) 414, and a packet accelerator card (not shown). Other cards used in the network device include line cards 466 and redundant crossbar cards (RCC) 418. The line cards 416, when loaded in the network device, provide input/output connectivity to the network and other devices, as well as redundancy connections. The line cards 416 include interfaces to the network through Ethernet, Fiber Optic, and the other communication mediums. The redundant crossbar card (RCC) 418 includes a non-blocking crossbar and connections to each of the cards in the network device. This allows a redundant connection to be made through the redundant crossbar card 418 from any one card to any other card in the network device. The SPIO card 410 serves as a controller of the network device and is responsible for such things as initializing the network device and loading software configurations onto other cards in the network device.

The system management card (SMC) 412 and switch processor card (not shown) are system control and management cards for managing and controlling other cards in the network device. The packet accelerator card (PAC) and packet service card (PSC) 414 provide packet processing, context processing capabilities, and forwarding capabilities among other things. The PAC and PSC 414 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

Figure 10:
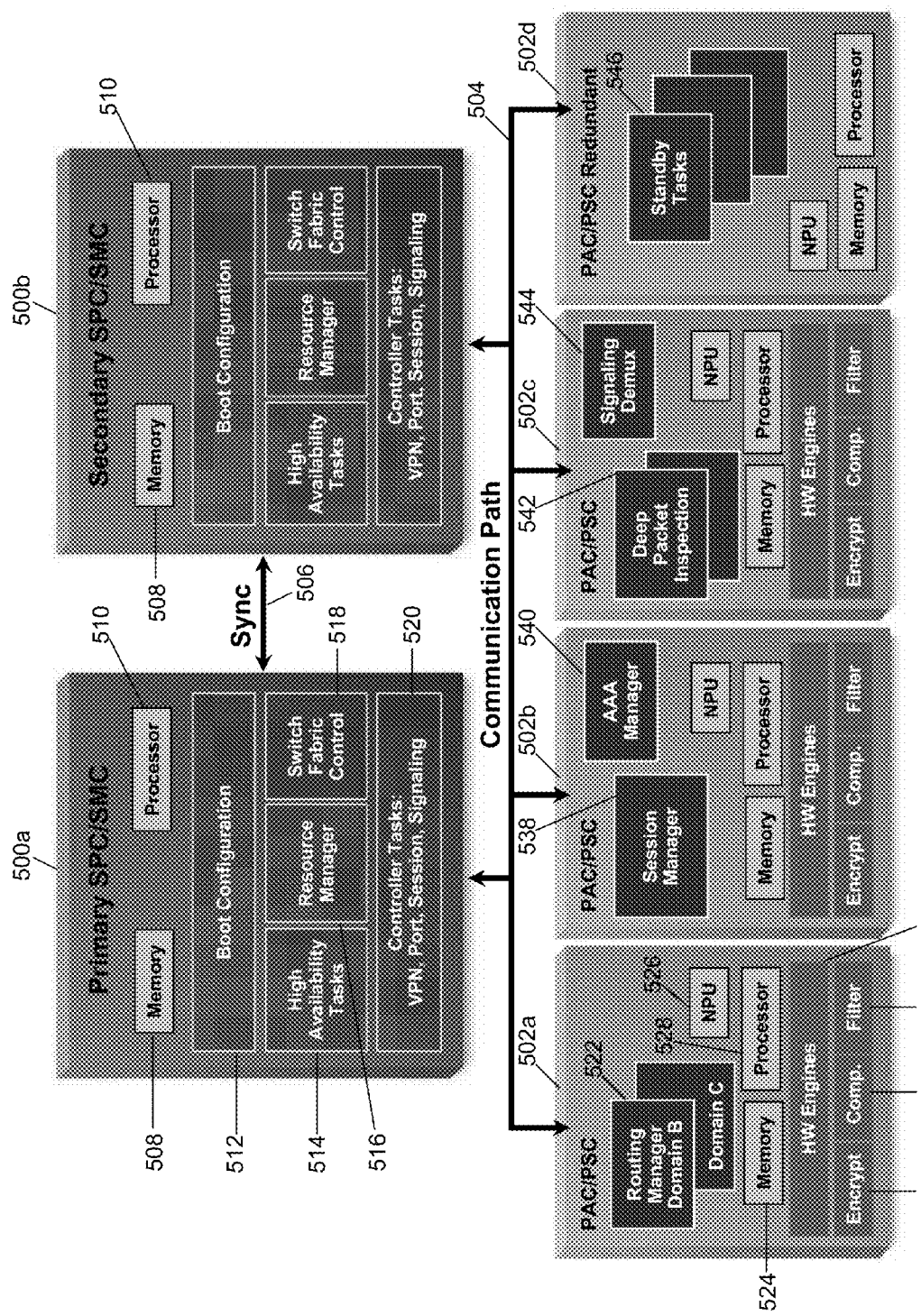
FIG. 10 illustrates a logical view of the software architecture of a network device in accordance with certain embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 10 illustrates a logical view of the software architecture of a network device in accordance with certain embodiments. As shown, the software and hardware can be distributed within the network device and across different circuit boards, processors, and memory. FIG. 10 includes a primary switch processor card (SPC)/system management card (SMC) 500*a*, a secondary SPC/SMC 500*b*, PAC/PSC 502*a*-502*d*, a communication path 504, and a synchronization path 506. The SPC/SMC 500 include a memory 508, a processor 510, a boot configuration 512, high availability tasks 514, resource manager 516, switch fabric control 518, and controller tasks 520.

The SPC/SMC 500 manages and controls the network device including the other cards in the network device. The SPC/SMC 500 can be configured in a primary and secondary arrangement that provides redundancy and failsafe protection. The modules or tasks running on the SPC/SMC 500 are related to network device wide control and management. The boot configuration task 512 includes information for starting up and testing the network device. The network device can also be configured to startup in different configurations and providing different implementations. These can include which functionalities and services are capable of running on the SPC/SMC 500. The high availability task 514 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 500 or a PAC/PSC 502, while some processor intensive tasks can also be performed across multiple PACs/PSCs to utilize multiple CPU resources. Distribution of these tasks is invisible to the user. The switch fabric control 518 controls the communication paths in the network device. The controller tasks module 520 can manage the tasks among the resources of the networks to provide, for example, VPN services, assign ports, and create, delete, and modify sessions for UE 134.

The PAC/PSC 502 is a high-speed processing card that is designed for packet processing and the tasks involved with providing various network functionalities on the network device. The PAC/PSC 502 include a memory 524, a network processing unit (NPU) 526, a processor 528, a hardware engine 530, an encryption component 532, a compression component 534, and a filter component 536. Hardware engines 530 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 502 is capable of supporting multiple contexts. The PAC/PSC 502 is also capable of running a variety of tasks or modules. PAC/PSC 502a provides routing managers 522 with each covering routing of a different domain. PAC/PSC 502b provides a session manager 538 and an AAA manager 540. The session manager 538 manages one or more sessions that correspond to one or more UE 134. A session allows a UE 134 to communicate with the network for voice calls and data. The AAA manager 540 manages accounting, authentication, and authorization with an AAA server in the network. PAC/PSC 502 provides a DPI task 542 and a signaling demux 544. The DPI task 542 provides inspection of packet information beyond layer 4 for use and analysis by the network device. The signaling demux 544 can provide scalability of services in combination with other modules. PAC/PSC 502d provides redundancy through standby tasks 546. Standby tasks 546 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, the mobility management entity can include a direct interface to a packet data network gateway to provide optimizations to loaded radio access transceivers.

We claim:

1. A network device comprising:
a first interface configured to communicate with a gateway in a cellular communication network;
a radio-related interface configured to communicate with at least one base station in the cellular communication network, wherein the radio-related interface is a same type of interface used by the at least one base station to communicate load information with other base stations in the radio access network; and
a functionality module configured to:
provide a mobility management device functionality that communicates control plane messages between the at least one base station and the gateway and manages mobility of a plurality of user equipments coupled to the at least one base station in the cellular communication network;
communicate to the at least one base station using the radio-related interface an indication that the functionality module is using a resource block used by the at least one base station, thus causing the at least one base station to regard the functionality module as another base station;
obtain load information associated with the at least one base station and the resource block via the radio-related interface, the load information being sent to the functionality module by the at least one base station as a result of the at least one base station regarding the functionality module as another base station;
periodically receive the load information associated with the at least one base station and the resource block and determine whether the information indicative of the load information should be sent to the gateway based on whether at least one threshold associated with the load information is exceeded; and
when the at least one threshold associated with the load information is exceeded, communicate the information indicative of the load information associated with the at least one base station and the resource block to the gateway to allow the gateway to modify contents of one or more packet flows destined to pass through the at least one base station to reduce the load of the at least one base station.

2. The network device of claim 1, wherein the functionality module is configured to send, over the radio-related interface, a failure message in response to a handover request message from one of the at least one base station, thereby avoiding being selected as a candidate for a handover of the user equipment.

3. The network device of claim 1, wherein the radio-related interface comprises an X2 interface.

4. The network device of claim 3, wherein the functionality module is configured to communicate, over the X2 interface, an X2 setup request message and a resource status request message to the at least one base station to request the load information associated with the at least one base station.

5. The network device of claim 1, wherein the functionality module is configured to:
receive, from the at least one base station, a resource status response message with the load information associated with the at least one base station, and
provide the load information associated with the at least one base station to the gateway when a predetermined condition is met.

6. The network device of claim 1, wherein the functionality module is configured to receive the load information associated with the at least one base station periodically and prioritize packet flow optimizations at the gateway based on the periodic load information.

7. The network device of claim 1, wherein the mobility management device functionality is configured to receive, from the at least one base station via the radio-related interface, physical resource block load information and determine, from the physical resource block load information, the load information associated with the at least one base station.

8. The network device of claim 1, wherein the functionality module is configured to establish communication with the at least one base station via the radio-related interface using a discovery mechanism used by base stations to discover other base stations in the radio access network.

9. The network device of claim 8, further comprising a control plane interface configured to provide control-plane communication with the at least one base station, and wherein the functionality module is configured to communicate with the at least one base station via the control plane interface to obtain an identity of the at least one base station, and use the identity of the at least one base station to establish the communication with the at least one base station.

10. The network device of claim 1, wherein the functionality module is configured to send, over the radio-related interface, a configuration update message in response to a handover request message from one of the at least one base station, thereby avoiding being selected as a candidate for a handover of the user equipment.

11. The network device of claim 1, wherein the functionality module is configured to send, to the gateway, instructions to selectively modify packet flows to alleviate loading conditions in the at least one base station.

12. The network device of claim 11, wherein the modifications to the packet flows can include one or more of video optimization, TCP optimization, or HTTP optimization.

13. The network device of claim 1, wherein the resource block includes a physical resource block.

14. The network device of claim 1, wherein the functionality module of the network device is further configured to:
    establish an X2 signaling connection with the at least one base station over the radio-related interface;
    manage retransmissions to the plurality of user equipments coupled to the at least one base station;
    handle a bearer activation/deactivation process;
    authenticate the plurality of user equipments by communicating with a home subscriber server;
    enforce user equipment roaming restrictions; and
    choose a gateway for a user equipment of the plurality of user equipments at the initial attachment of the user equipment and at the time of an intra-LTE handover of the user equipment.

15. A method comprising:
    communicating control plane messages, at a mobility management device, between at least one base station and a gateway in a cellular communication network and managing, at the mobility management device, mobility of a plurality of user equipments coupled to the at least one base station in the cellular communication network;
    communicating, by the mobility management device, with the at least one base station over a radio-related interface, wherein the radio-related interface is a same type of interface used by the at least one base station to communicate load information with other base stations in a radio access network, thereby causing the at least one base station to regard the mobility management device as another base station;
    indicating, by the mobility management device, to the at least one station that the mobility management device is using a resource block used by the at least one base station, thereby masquerading the mobility management device as a base station;
    receiving, at the mobility management device, load information associated with the at least one base station and the resource block over the radio-related interface from the at least one base station, the load information being sent to the mobility management device by the at least one base station as a result of the at least one base station regarding the mobility management device as another base station;
    periodically receiving the load information associated with the at least one base station and the resource block and determine whether the information indicative of the load information should be sent to the gateway based on whether at least one threshold associated with the load information is exceeded; and
    when the at least one threshold associated with the load information is exceeded, communicating the information indicative of the load information associated with the at least one base station and the resource block to the gateway to allow the gateway to modify contents of one or more packet flows destined to pass through the at least one base station to reduce the load of the at least one base station.

16. The method of claim 15, further comprising sending, over the radio-related interface, a failure message in response to a handover request message from one of the at least one base station, thereby avoiding being selected as a candidate for a handover.

17. The method of claim 15, further comprising:
    receiving a resource status response message from the at least one base station with the load information; and
    communicating the load information to the gateway when a threshold is met.

18. The method of claim 15, further comprising receiving periodic load information updates and prioritizing packet flow optimizations at the gateway based on the periodic base station load information.

19. A non-transitory computer readable medium having executable instructions operable to cause a processor of a mobility management device to:
    communicate control plane messages between at least one base station and a gateway in a cellular communication network and manage mobility of a plurality of user equipments coupled to the at least one base station in the cellular communication network;
    communicate with the at least one base station over a radio-related interface, wherein the radio-related interface is a same type of interface used by the at least one base station to communicate load information with other base stations in a radio access network, thereby causing the at least one base station to regard the mobility management device as another base station;
    indicate to the at least one base station that the mobility management device is using a resource block used by the at least one base station, thereby masquerading the mobility management device as a base station;
    receive load information associated with the at least one base station and the resource block over the radio-related interface from the at least one base station, the load information being sent to the mobility management device by the at least one base station as a result of the at least one base station regarding the mobility management device as another base station;
    periodically receive the load information associated with the at least one base station and the resource block and determine whether the information indicative of the load information should be sent to the gateway based on whether at least one threshold associated with the load information is exceeded; and
    when the at least one threshold associated with the load information is exceeded, communicate the information indicative of the load information associated with the at least one base station and the resource block to the gateway to allow the gateway to modify contents of one or more packet flows destined to pass through the at least one base station to reduce the load of the at least one base station.

20. The non-transitory computer readable medium of claim 19, wherein the instructions are further operable to cause the processor to send a failure message in response to a handover request message from one of the at least one base station, thereby avoiding being selected as a candidate for a handover.

21. The non-transitory computer readable medium of claim 19, wherein the instructions are further operable to cause the processor to send load information regarding a particular base station to a corresponding gateway to begin packet flow optimizations to the particular base station when a scalar threshold is exceeded from the base station load information.

* * * * *